United States Patent [19]
Krauthäuser et al.

[11] Patent Number: 5,962,143
[45] Date of Patent: Oct. 5, 1999

[54] COATING COMPOSITION FOR PRODUCING HEAT RADIATION-REFLECTING COATINGS

[75] Inventors: Helmuth Krauthäuser, Köln; Christian Gruner, Hürth; Gerd Huthmacher, Köln, all of Germany

[73] Assignee: Herberts GmbH, Wuppertal, Germany

[21] Appl. No.: 08/877,392

[22] PCT Filed: Oct. 30, 1996

[86] PCT No.: PCT/EP96/04703

§ 371 Date: Feb. 23, 1998

§ 102(e) Date: Feb. 23, 1998

[87] PCT Pub. No.: WO97/16493

PCT Pub. Date: May 9, 1997

[30] Foreign Application Priority Data

Nov. 1, 1995 [DE] Germany ............................ 195 40 682

[51] Int. Cl.$^6$ .............................. B05D 7/06; B05D 7/02; B05D 7/16
[52] U.S. Cl. .................... 428/425.1; 428/425.8; 428/458; 428/511; 524/88
[58] Field of Search .................... 428/458, 511, 428/425.1, 425.8; 524/88

[56] References Cited

U.S. PATENT DOCUMENTS 4,272,291  6/1981  Shtern et al. ................... 106/14.05

FOREIGN PATENT DOCUMENTS

| 0 340 313 | 11/1989 | European Pat. Off. . |
| 4035062 | 5/1992 | Germany . |
| 4-246478 | 9/1992 | Japan . |
| 5-293434 | 11/1993 | Japan . |
| 5-321159 | 12/1993 | Japan . |
| 2 066 825 | 7/1981 | United Kingdom . |
| 2 177 103 | 1/1987 | United Kingdom . |
| 8904351 | 5/1989 | WIPO . |
| WO 92/08152 | 5/1992 | WIPO . |

OTHER PUBLICATIONS

Sep. 2, 1992, Derwent Pulbications Ltd., London, GB; XP002026368 (Abstract).

*Primary Examiner*—Erma Cameron
*Attorney, Agent, or Firm*—Merchant, Gould, Smith, Edell, Welter & Schmidt, P.A.

[57]      ABSTRACT

Coating composition for producing heat radiation-reflecting coatings.

The invention relates to a coating composition for producing heat radiation-reflecting coatings that contains a binder, pigments and solvents and/or water. One or more black pigments or specially formulated colored pigments are used as pigments. The coating composition also contains finely dispersed silicic acid. The coating composition is particularly suitable for coating metal, wood or plastics, and may for example reduce heating effects in interiors of means of transportation.

6 Claims, No Drawings

COATING COMPOSITION FOR PRODUCING HEAT RADIATION-REFLECTING COATINGS

The present invention relates to a coating composition for producing heat radiation-reflecting coatings, containing a binder, pigments and solvents and/or water, which reduces the heating effect due to solar radiation on materials and interiors coated therewith.

There is an increasing tendency to clad exteriors of buildings with glass and other transparent materials, with the result that in particular the dark surfaces of interiors are strongly heated by direct solar radiation and produce high room temperatures. Heating caused by solar radiation may in particular also occur in interiors of means of transport such as buses, trams, airplanes, etc., due to the dark-coloured surfaces. When using plastics for facade elements or window profiles, especially in dark colours, the heat that is generated can lead to damage such as cracks, reduction in gloss and colour fading.

In order to reduce or avoid such heating effects, especially in the case where dark colours are used, coating systems containing pigments have been developed that do not or only slightly absorb infrared radiation. Their action is based on the fact that a paint film containing such pigments is applied to a lighter background that reflects the radiation in the infrared wavelength region and this radiation is not completely absorbed and converted into heat by the pigments in the coating, with the result that only a small amount of heat is generated.

JP-A 53 21 159 describes the use of black pigments, in particular perylene and azomethine azo black with an IR reflection of more than 600 in a wavelength range from 900 to 1500 nm.

JP-A 42 46 478 describes IR-reflecting surfaces in connection with a coating material that contains, inter alia, perylene-based pigments or azo pigments. A degree of reflection of 80% is achieved.

For use in coating materials that are to have specific, accurately predetermined colours and a predetermined appearance, these pigments must be combined with other coloured pigments. This leads to absorption phenomena of visible and infrared radiation components at the boundaries of the various pigments, resulting in an increased heating and undesirable colour effects.

According to JP-A 52 93 434 a special combination of coloured pigments each having a specific characteristic value for the reflection is used to protect against heating caused by solar radiation. Only pigments that are red, orange and yellow have favourable values of over 40% of this defined characteristic value, with the result that only slight reflection effects are produced when the pigments are combined to form dark colours. Furthermore, here too there is the possibility of undesired absorption phenomena, especially of infrared radiation fractions, occurring at the boundaries of the various pigments.

According to U.S. Pat. No. 4,272,291 oxides of titanium, nickel, antimony and chromium are used as heat-reflecting pigments, blending agents such as talcum and dolomite also being employed.

WO 89/43 51 describes thermally insulating coloured compositions containing pigment mixtures of one or more oxides of zirconium, yttrium and indium. In addition further oxides such as titanium dioxide, barium oxide and silicon oxide may be included, crystalline structures being used. If dark colours are desired, corresponding dark pigments must in addition be added to the composition.

The use of the metal compounds described in both publications is greatly restricted on account of the harmful effects on health of these compounds. Moreover, they are generally extremely expensive. If appropriate pigments are mixed in to produce dark colours, there is the danger of undesired absorption phenomena at the boundaries of the pigments and thus of undesired side effects.

DE-A 40 35 062 discloses a general method according to which interiors are provided with a surface that reflects IR radiation. Titanium dioxide, aluminium platelet pigments and chromium oxide are mentioned as IR-reflecting pigments and as suitable IR-reflecting pigments for producing camouflage colours. The disadvantage is that the process involves a special IR-reflecting substrate as well as a paint film containing special IR-permeable pigments applied thereto. The aforementioned substrate requires an additional process expenditure and resources and, on account of the aforedescribed bright, white or metallic surface causes hiding power problems - especially at the edges - during the subsequent coating in dark colours.

The object of the invention is to provide a coating composition for dark coloured coatings that contains a combination of various types of pigments. These are intended to impart heat radiation-reflecting properties to the objects coated therewith without resulting in the aforedescribed disadvantages, in particular so that the absorption of infrared radiation at the boundaries of the various pigments is largely avoided.

It has been found that this object can be achieved by a coating composition of the type described in the introduction, which is characterised in that it contains the following film-forming constituents a) 1 to 8 wt. % of one or more black pigments,
b) 0.1 to 10 wt. % of one or more coloured pigments,
c) 0 to 10 wt. % of white pigment,
d) 3 to 30 wt. % of finely dispersed silicic acid,
e) 0 to 25 wt. % of further pigments and fillers,
f) 40 to 85 wt. % of binder, and
g) 0 to 10 wt. % of paint additives wherein the sum of the film-forming constituents comprises 100 wt. %, and the coloured pigments to be used as component b) when used in a test paint of the following composition 20 parts by weight of solid binder based on polyurethane, polyester, polyacrylate and/or alkyd resins,
70 parts by weight of solvent, water or mixtures thereof,
x parts by weight of the coloured pigment to be tested,
    x=10 when testing inorganic coloured pigments and
    x=4 when testing organic coloured pigments, and when applying the test paint to transparent plastics film to give a resultant dry layer thickness of 45 µm, produce an average transmission value of less than 10% in the wavelength range from 400 to 700 nm, lead to an increase in the transmission value to a value of more than 70% in the wavelength range from 700 to 1250 nm, and produce an average transmission value of more than 70% in the wavelength range from 1250 to 2000 nm, and/or when applying the test paint to a white substrate to give a resultant dry layer thickness of 45 µm, produce a diffuse reflection value of less than 15% at a wavelength of 500 nm and produce an average reflection value of more than 50% in the wavelength range from 1200 to 2000 nm.

A preferred embodiment is the aforedescribed coating composition according to the invention that includes the following film-forming constituents:

a) 3 to 6 wt. % of perylene black, azomethine black and/or chromium black b) 0.8 to 3 wt. % of Paloma Blue B a registered trademark for a blue organic pigment manufactured by the Bayer AG corporation 4806, Bayferrox 3920 a registered trademark for a red inorganic pigment manufactured by Bayer AG and/or cobalt green c) 0 to 10 wt. % of titanium dioxide d) 5 to 12 wt. % of finely dispersed silicic acid e) 0 to 15 wt. % of further pigments and fillers f) 60 to 80 wt. % of polyurethane resin dispersion or hydroxyfunctional acrylate or polyester resins in combination with isocyanate hardeners g) 2 to 6 wt. % of paint additives, the sum of the film-forming constituents comprising 100 wt. %.

Particularly preferred is an embodiment of the aforedescribed coating composition according to the invention that contains the following film-forming constituents:

a) 4 to 5 wt. % of chromium black (for example Chromatin Black)

b) 1 to 2 wt. % of cobalt green (for example Light Green 5 G)

c) 0 to 10 wt. % of titanium dioxide d) 7 to 8.5 wt. % of finely dispersed silicic acid e) 9 to 10 wt. % of further pigments and/or fillers f) 68 to 78 wt. % of polyurethane resin dispersion, optionally containing OH functional groups, and g) 3 to 4 wt. % of paint additives.

Black pigments that may be used include pigments of the perylene and azomethine type, for example perylene black and azomethine black. In addition there may also be used suitable metal compounds that permit heat reflection. Such compounds include for example black chromium, iron, nickel, spinel, and cobalt black. In principle however all black pigments that do not significantly absorb infrared radiation are suitable. The various commercially available products are known to the person skilled in the art, and their action in terms of the aforementioned behaviour with respect to infrared radiation has been described in detail (see for example the material published by BASF "Paliogenschwarz" L 0084, June 1983). The black pigments may be used individually or as a mixture. Preferred black pigments are perylene black, azomethine black or chromium black (e.g. Chromatin Black).

Certain suitable coloured pigments are used according to the invention. The suitability of the coloured pigments depends on their transmission curve or diffuse reflection curve.

In order to test the suitability of the coloured pigments, test paints containing 20 parts by weight of the pigment to be tested, referred to 100 parts by weight of solid binder, are dispersed in a conventional test paint formulation, applied in a 45 μm dry layer thickness to a white substrate for diffuse reflection measurements or to a transparent plastics film for transmission measurements, and measured. A similar procedure is adopted in the case of inorganic pigments, except that 50 parts by weight of pigments referred to 100 parts by weight of solid binder are employed.

In this system the coloured pigments must be formulated so that they satisfy at least one of the following two conditions.

In order to test the first condition, the transmission curve is plotted in a spectral range from 400 to 2000 nm.

For the suitable coloured pigments according to the invention, the transmission curve must be approximated by a box-shaped profile such that between 700 and 1250 nm the transmission curve increases sharply from less than or equal to 10% to greater than or equal to 70%.

The further shape of the transmission curve up to a wavelength of 2000 nm should retain an average value of greater than or equal to 70%.

In order to check the second condition a diffuse reflection curve is plotted. Using the aforedescribed test paint and maintaining the described layer thickness, the diffuse reflection curve on a white background should exhibit a value of less than 15% at a wavelength of 500 nm, and in its further course should exhibit an average value of more than 50% in the wavelength range from 1200 to 2000 nm.

Suitable coloured pigments according to the invention include for example Palomar Blue B 4806 or Bayferrox 3920 or cobalt green (e.g. Light Green 5G).

Titanium dioxide is suitable as white pigment. It is not essential for the composition according to the invention to contain this pigment.

In addition to the black pigments and the colour pigments used according to the invention, the coating composition according to the invention contains amorphous, highly porous silicic acid as a further constituent. Such substances are produced by flame hydrolysis or precipitation and have special surfaces of 100 to 400 $m^2$ per gram (BET surface). They are described for example in the Degussa leaflet series No. 6, p. 2. An example of a suitable substance is Aerosil TT600 (Degussa). This constituent obviously ensures sufficient spacings between the various pigments to prevent absorption by multiple reflection. Also, refraction phenomena of the IR radiation occur on account of the finely dispersed, amorphous structure, which overall produce a reflection of the radiation. 3 to 30 wt. % of silicic acid, referred to the film-forming constituents, is necessary.

The coating composition according to the invention may optionally also contain further pigments or fillers, for example kaolin and talcum. The addition of these further pigments is possible without causing an absorption of infrared radiation and thus a deleterious effect on the reflective action of the pigments used according to the invention.

The coating composition according to the invention may contain binders conventionally used in the paint industry. Such binders include for example alkyd resins, polyurethane resins, polyester resins, polyacrylate resins as well as melamine resins. These binder components are produced by the conventional process known to the person skilled in the art. Particularly suitable binders for the coating composition according to the invention are isocyanate-hardening hydroxyfunctional acrylates or polyesters. The latter are preferred if soft coatings that feel pleasant to the touch are to be produced.

The binders that can be used according to the invention may optionally be employed with conventional crosslinking agents and additives. Such additives may for example be light stabilisers, stabilisers, wetting agents and waxes.

The latter are used for example as flatting agents to adjust the paint to a specific degree of gloss of the paint film.

The coating composition according to the invention may contain water and/or solvents to adjust the composition to the desired application viscosity. Suitable solvents include glycols, alcohols, esters and hydrocarbons.

The coating system according to the invention can be processed by means of the known techniques, for example atomisation by compressed air using a paint spray gun, high-speed rotary bell jars combined with electrostatic spray processes, casting and rolling. The coatings produced from the coating compositions according to the invention can be cured in a wide range of temperatures, for example 20° C. to 130° C., preferably between 60° C. and 90° C.

The coating composition according to the invention is suitable for coatings on objects and surfaces in which a significant heat generation is to be avoided. These may be objects and surfaces of metal, wood, plastics, plastics films and other materials to be provided with a dark coloured coating. The coating system according to the invention may also be used in a multilayer process. For example, a primer may be applied before coating with the system according to the invention and a clear lacquer may be applied after coating with the system according to the invention. Examples of objects that can be coated include equipment and structures in the interior of buildings, airplanes, trains, or other means of transportation, facade elements of buildings, camera housings, etc. The colour of the coating substrate onto which the paint composition according to the invention is to be applied is not essential for the invention. In the case of pigmented plastics or other pigment-containing substrates those colours and shades that are conventional and desirable may be used, without taking into account the desired IR radiation behaviour. Plastics substrates pigmented a black or grey colour with carbon black may thus also be used.

The coating system according to the invention enables objects or surfaces to be coated in dark shades while at the same time reducing heating of the coated objects and surfaces. In contrast to other coating systems that produce IR radiation-reflecting or heat-reflecting surfaces, the coating composition according to the invention containing the special constituents also enables substrates coloured dark grey to black with carbon black as well as arbitrary adjustments of colours to dark shades to be coated with only one coat of paint.

The following examples serve to illustrate the invention.

EXAMPLE 1
Preparation of a Paint According to the Invention:

1.3 g of chromofine black A1103 (from Dainichiseika) and 0.1 g of coloured pigment Bayferrox 3920FF (a registered trademark for a commercial product from Bayer AG) are dispersed for 30 minutes in 47 g of binder solution Bayhydrol VPLS 2058 a registered trademark for a resin binder material manufactured by Bayer AG in a bead mill at 50° C. 6 g of Aerosil TT600 (a registered trademark for a silicic acid that is a commercial product from Degussa) are incorporated by high-speed stirring using a laboratory dissolver and the mixture is completed with 15 g of the above binder solution, 8 g of methoxypropanol solvent and 7 g of water. Before processing, 15 g of Bayhydur VPLS 2980 (a registered trademark for a resin binder material that is a commercial product from Bayer) are stirred in as hardening agent.

Coating of a white-pigmented substrate with the paint according to the invention:

The paint is applied using a flow cup gun in a 30 μm dry layer thickness to a white-pigmented ABS plastics plate and then dried for 30 minutes at 80° C. A uniform black colour is produced.

EXAMPLE 2
Coating of a Grey-Pigmented Substrate With the Paint According to the Invention:

A plastics plate that has been coloured medium grey with carbon black pigment and white pigment is coated according to Example 1. A uniform black colour is produced.

Testing of the IR radiation behaviour of the coating according to the invention:

The plate coated according to Example 1 is irradiated at a distance of 40 cm for 300 seconds with an infrared lamp and the temperature is then immediately measured. The temperature is 58° C.

Testing of the IR radiation behaviour of the coating according to the invention:

The plate coated according to Example 2 is tested in the same way for a temperature increase. The measured end temperature is 60° C.

COMPARISON EXAMPLE 1
Preparation of the Comparison Paint and Coating of a Substrate:

1.4 g of special pigment Paliogen Black L0084 (a registered trademark for a black pigment that is a commercial product manufactured by BASF) and 6 g of quartz pigment Sillitin N (a registered trademark for a quartz pigment that is a commercial product manufactured by Quarzwerke) are dispersed for 30 minutes in 42 g of binder solution Bayhydrol VPLW a registered trademark for a resin binder material manufactured by Bayer AG 2058 in a bead mill at 50° C. The mixture is completed with 15 g of the above binder solution, 8 g of methoxy propanol and 7 g of water. Before processing, 15 g of Bayhydur VPLS a registered trademark for a resin binder material manufactured by Bayer AG 2980 is incorporated as hardening agent.

The comparison paint is applied according to Example 1.

An almost black colour but with a greenish shade is produced.

COMPARISON EXAMPLE 2
Preparation of a Comparison Paint and Coating of a Substrate:

A paint is prepared in the same way as comparison example 1, but contains 1.4 g of Chromofine Black A 1103 a registered trademark for a black inorganic pigment manufactured by Dainichiseika instead of Paliogenschwarz a registered trademark for a black inorganic pigment manufactured by BASF Corporation.

Coating of a plastics plate according to Example 1 with this paint produces a coating that is almost black but exhibits a distinctly violet shade.

COMPARISON EXAMPLE 3
Preparation of a Comparison Paint and Coating of a Substrate:

1.1 g of special pigment Paliogenschwarz a registered trademark for a black inorganic pigment manufactured by BASF Corporation L 0084 are dispersed for 30 minutes in 46 g of binder solution Bayhydrol VPLS 2058 a registered trademark for a resin binder material manufactured by Bayer AG in a bead mill at 50° C. The mixture is completed with 15 g of the above binder solution, 8 g of methoxypropanol solvent and 7 g of water. Before processing, 15 g of Bayhydur VPLS 2058 a registered trademark for a resin binder material manufactured by Bayer AG are stirred in as hardening agent. As much coloured paste consisting of 2 parts by weight of carbon black pigment in 100 parts by weight of the above binder solvent is added, while stirring, until the mixture corresponds to that of Example 1 as regards achromaticity (absence of extraneous shade) and deep dark grey colour.

A uniform black colour is obtained after coating according to Example 1 with this paint.

Testing the IR radiation behaviour:

The plate coated according to comparison example 1 is irradiated at a distance of 40 cm for 300 seconds with an infrared lamp, and the temperature is then immediately measured. The temperature is 76° C.

We claim:

1. A coating composition for producing heat radiation-reflecting coatings, containing a binder, pigments and solvents or water or a mixture of solvents and water, comprising the following film-forming components a)–g):

a) 1 to 8 wt. % of one or more black pigments, b) 0.1 to 10 wt. % of one or more colored pigments, c) 0 to 10 wt. % of white pigment, d) 3 to 30 wt. % of particulate silicic acid, e) 0 to 25 wt. % of further pigments and fillers, f) 40 to 85 wt. % of binder, and g) 0 to 10 wt. % of paint additives wherein the sum of the film-forming components is 100 wt. %, and the suitability of the colored pigments to be used as component b) is determined by their formulation in a test paint of the following composition:

20 parts by weight of solid binder based on polyurethane, polyester, polyacrylate and/or alkyd resins, 70 parts by weight of solvent, water or mixtures thereof, x parts by weight of the colored pigment to be tested, x=10 when testing inorganic colored pigments and x=4 when testing organic colored pigments, and when applied to transparent plastics film the test paint gives a resultant dry layer thickness of 45 μm, produces an average transmission value of less than 10% in the wavelength range from 400 to 700 nm, leads to an increase in the transmission value to a value of more than 70% in the wavelength range from 700 to 1250 nm, and produces an average transmission value of more than 70% in the wavelength range from 1250 to 2000 nm, applied to a white substrate the test paint gives a resultant dry layer thickness of 45 μm, produce a diffuse reflection value of less than 15% at a wavelength of 500 nm and produces an average reflection value of more than 50% in the wavelength range from 1200 to 2000 nm.

2. A coating composition according to claim 1, comprising the following film-forming components a)–g):

a) 3 to 6 wt. % of perylene black, azomethine black and/or chromium black b) 0.8 to 3 wt. % of copper phthalocyamine blue pigment, iron oxide red pigment and/or cobalt green c) 0 to 10 wt. % of titanium dioxide d) 5 to 12 wt. % of particulate silicic acid e) 0 to 15 wt. % of further pigments and fillers f) 60 to 80 wt. % of polyurethane resin dispersion or hydroxyfunctional acrylate or polyester resins in combination with isocyanate hardeners g) 2 to 6 wt. % of paint additives, the sum of the film-forming components being 100 wt. %.

3. A coating composition according to claim 1, wherein the particulate silicic acid has a specific surface (BET surface) of 100 to 400 $m^2/g$.

4. Coating composition according to claim 1, wherein the binder, is hydroxyfunctional acrylate or polyester resins combined with an isocyanate hardening agent.

5. A coated metal, wood or plastic comprising metal, wood or plastic coated with a cured coating composition according to claim 1.

6. A heat radiation-reflecting coating in an interior of a means of transportation comprising the interior coated with a cured coating composition according to claim 1.

* * * * *